United States Patent [19]

Albader

[11] Patent Number: 5,617,732
[45] Date of Patent: Apr. 8, 1997

[54] AUTOMOTIVE AIR CONDITIONING SYSTEM

[76] Inventor: Rashaid A. Albader, 16 Harcourt St., Apt. 6-C, Boston, Mass. 02116

[21] Appl. No.: 491,790

[22] Filed: Jun. 19, 1995

[51] Int. Cl.⁶ .......................... F25B 27/00; F16D 31/02
[52] U.S. Cl. .................... 62/228.5; 60/464; 62/323.1; 180/53.4; 417/405
[58] Field of Search .............. 62/323.1, 228.5, 62/501, 498, 243; 417/364, 405; 180/53.4; 60/418, 464

[56] References Cited

U.S. PATENT DOCUMENTS

| | | | |
|---|---|---|---|
| 2,518,316 | 8/1950 | Henney | 180/53.4 X |
| 2,899,941 | 8/1959 | Adams | 62/323.1 X |
| 2,916,880 | 12/1959 | Hann | 62/323.1 X |
| 3,044,405 | 7/1962 | Bent | 60/418 X |
| 5,085,269 | 2/1992 | Aoki | 62/323.1 |

*Primary Examiner*—William E. Wayner
*Attorney, Agent, or Firm*—Cesari and McKenna

[57] ABSTRACT

An automotive air conditioning system is provided. The air conditioning system includes an air conditioning compressor. A reservoir having fluid is provided. A pump is interconnected with the reservoir and operatively interconnected with and driven by an engine of a vehicle. The pressure chamber is interconnected with the pump and receives fluid from the pump. A fluid drive element, located relative to the pressure chamber, and interconnected with the air conditioning compressor, converts a passage of pressurized fluid therethrough into mechanical driving force for driving the air conditioning compressor. A regulator maintains a selected level of pressure in the pressure chamber and diverts excess fluid from the pressure chamber to the reservoir so that a constant air conditioning compressor driving speed is maintained.

10 Claims, 5 Drawing Sheets

AUTOMOTIVE AIR CONDITIONING SYSTEM

FIELD OF THE INVENTION

This invention relates to an automotive air conditioning system and more particularly to an air conditioning system that operates at a constant power level with increased reliability regardless of engine speed.

BACKGROUND OF THE INVENTION

Air conditioning is a highly desirable and, in some instances, essential feature in modern automobiles and other vehicles. In a typical installation, a compressor is used to pressurize and propel a volatile refrigerant such as Freon through a closed-loop system. A cooling coil is provided in the closed loop within the passenger compartment of the vehicle. The compressed, liquid phase, refrigerant expands into a gaseous phase as it passes through the cooling coil causing ambient heat to be withdrawn from the surrounding air. The withdrawal of heat cools the vehicle. The heated, expanded, refrigerant is subsequently repressurized by the compressor, causing loss of heat to the outside air. So long as the compressor continues to operate, the refrigerant continues to circulate through the system exchanging heat between the inside and the outside of the vehicle by an associated phase change in the refrigerant.

The air conditioning compressor in most vehicles is powered by direct interconnection with the engine which, in most cases, is an internal combustion engine powered by gasoline, diesel fuel or a similar combustible compound. The compressor is typically interconnected with the engine's crankcase by a power transmission belt provided between a pulley on the compressor and an associated driving pulley on the engine. The driving pulley is, similarly, connected with a variety of other engine components including a water circulation pump, a cooling fan, and an electrical generator or alternator. The engine's driving pulley is usually driven directly from the crankcase and, hence, rotates at a speed that is directly proportional with the speed of engine operation. Thus, when the engine operates at an idling speed of, for example, 1,000 RPM, the air conditioning compressor pulley is driven at a proportionate idle speed. Conversely, when the engine is driven at a cruising speed at, for example, 4,000 RPM, the compressor is driven at approximately 4 times the idle speed.

A typical air conditioning compressor is operated by simply engaging an air conditioning-on switch which causes an electrical clutch in the compressor's pulley to lock the pulley relative to a compressor drive shaft. When the switch is "off", the drive shaft and pulley are disengaged and the pulley simply free wheels relative to the drive shaft. The associated disadvantage to this arrangement is described further below. Nevertheless, the great variation in driving speeds of the air conditioning compressor as engine speed changes, causes a significant variation in refrigerant pressurization. The variation in refrigerant pressurization causes a substantial variation in air conditioning cooling output. For example, at idle, the compressor's cooling output can be approximately 6,000 BTU. When the car is traveling at approximately 3,500 RPM, this output can be approximately 36,000 BTU. Hence, the air conditioner may not provide sufficient cooling at a low RPM, while the cooling is more efficient at cruising speed. At higher speeds, in which engine speed exceeds 5000 RPM, the compressor cannot operate for long periods without becoming damaged. Hence most compressors include a shutoff control that signals the clutch to disengage from the engine. Hence at high speeds the compressor continually cycles on and off. This can lead to discomfort on hot days in which continual cooling is required.

Similarly, it has been shown that the compressor suffers accelerated damage when it is operated at high RPMs. Thus, it is often desirable to deactivate the air conditioning when cruising. This can lead to discomfort on very-hot days.

As discussed above, the operation of the air conditioner compressor's clutch can lead to further damage since, at high RPMs, the sudden activation of the clutch sends a shock through the compressor as it is "slammed on". There is also increased risk of fan belt breakage when the clutch suddenly engages the compressor at higher speed. It would be preferable to power the compressor via a gradual acceleration to a fully-powered state.

It is, therefore, an object of this invention to provide an air conditioning system for vehicles that operates at a substantially constant speed and cooling output regardless of engine speed. It is a further object of this invention to provide an air conditioning system that operates continuously at a speed that minimizes air conditioning compressor damage. It should be possible to activate and deactivate the compressor at will, while the engine is operating at any speed without risk of damage to the compressor or other engine components. Cooling output by the system should not be excessive at high engine speed and should be sufficient at idle and low engine speed.

SUMMARY OF THE INVENTION

This invention provides an improved automotive air conditioning system that avoids the disadvantages of the prior art by providing a regulated power supply for an air conditioning compressor that maintains the driving speed of the air conditioning compressor at a substantially constant value. A reservoir having fluid is provided. A pump is interconnected to the reservoir and operatively interconnected with, and driven by, an engine of the vehicle. A pressure chamber is interconnected with the pump and receives fluid from the pump. A fluid drive element, located relative to the pressure chamber, and interconnected with an air conditioning compressor, converts passage of pressurized fluid therethrough into a mechanical driving force that drives the air conditioning compressor. A regulator maintains a selected level of pressure in the pressure chamber. The regulator operates by diverting excess fluid from the pressure chamber to the reservoir.

In a preferred embodiment, the regulator includes a check valve that opens in response to a fluid pressure in the pressure chamber that exceeds a predetermined maximum value. The regulator system can also include a control valve, typically having a separate return line to the reservoir, that transfers a predetermined volume of fluid from the pressure chamber in response to a control signal. This arrangement enables the pressure in the chamber to be varied by a user in order to, likewise, vary the pressure of fluid passing through the fluid drive element. Hence, the fluid drive element speed and corresponding air conditioning compressor speed can be varied. The check valve can be a movable stop and spring that biases the movable stop into a sealed orientation. The spring imparts a force that is overcome by a predetermined pressure in the pressure chamber that is greater than the maximum desired pressure.

BRIEF DESCRIPTION OF THE DRAWINGS

The foregoing and other objects and advantages of the invention will become more clear with reference to the

Figure 1:
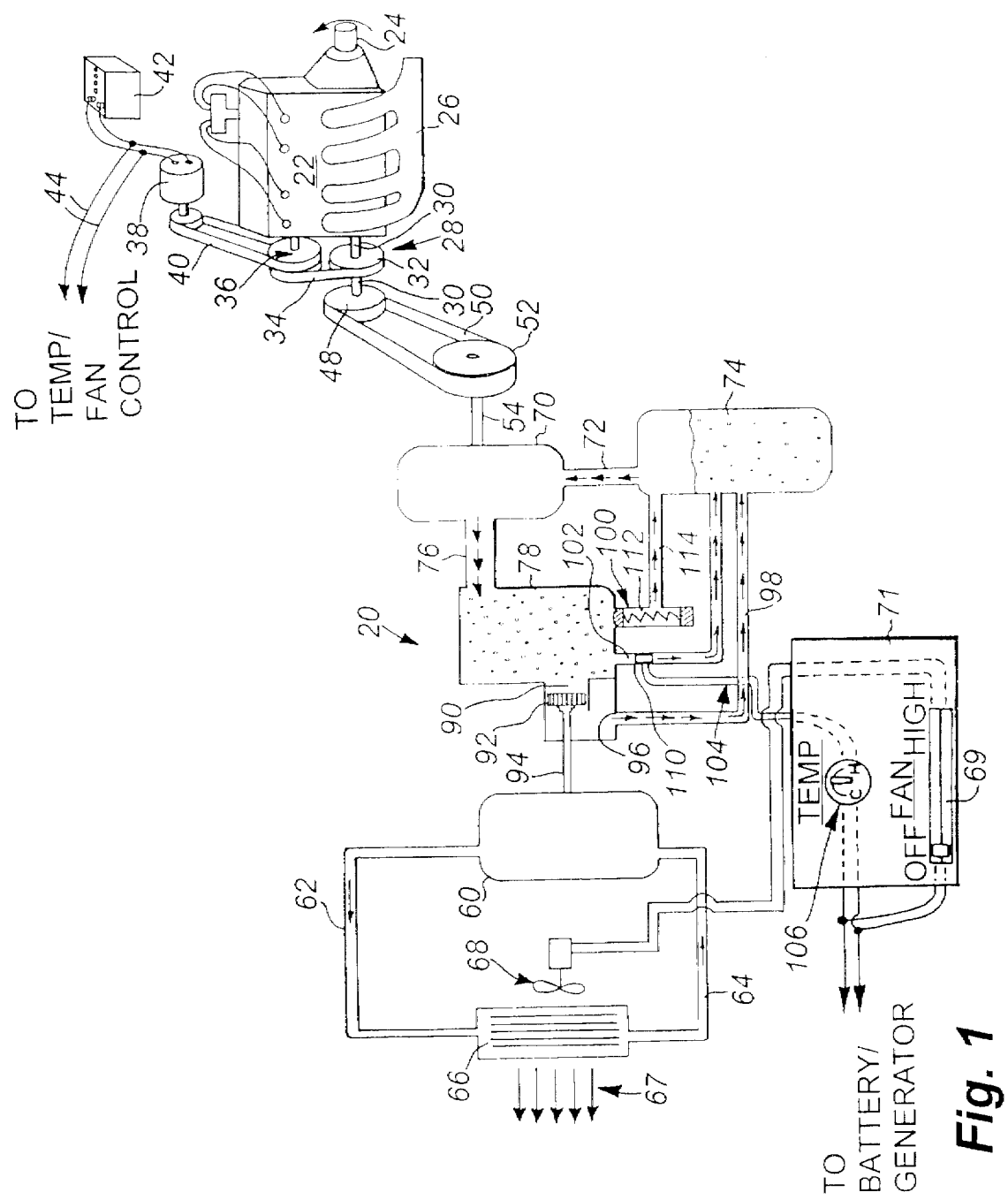
Figure 2:
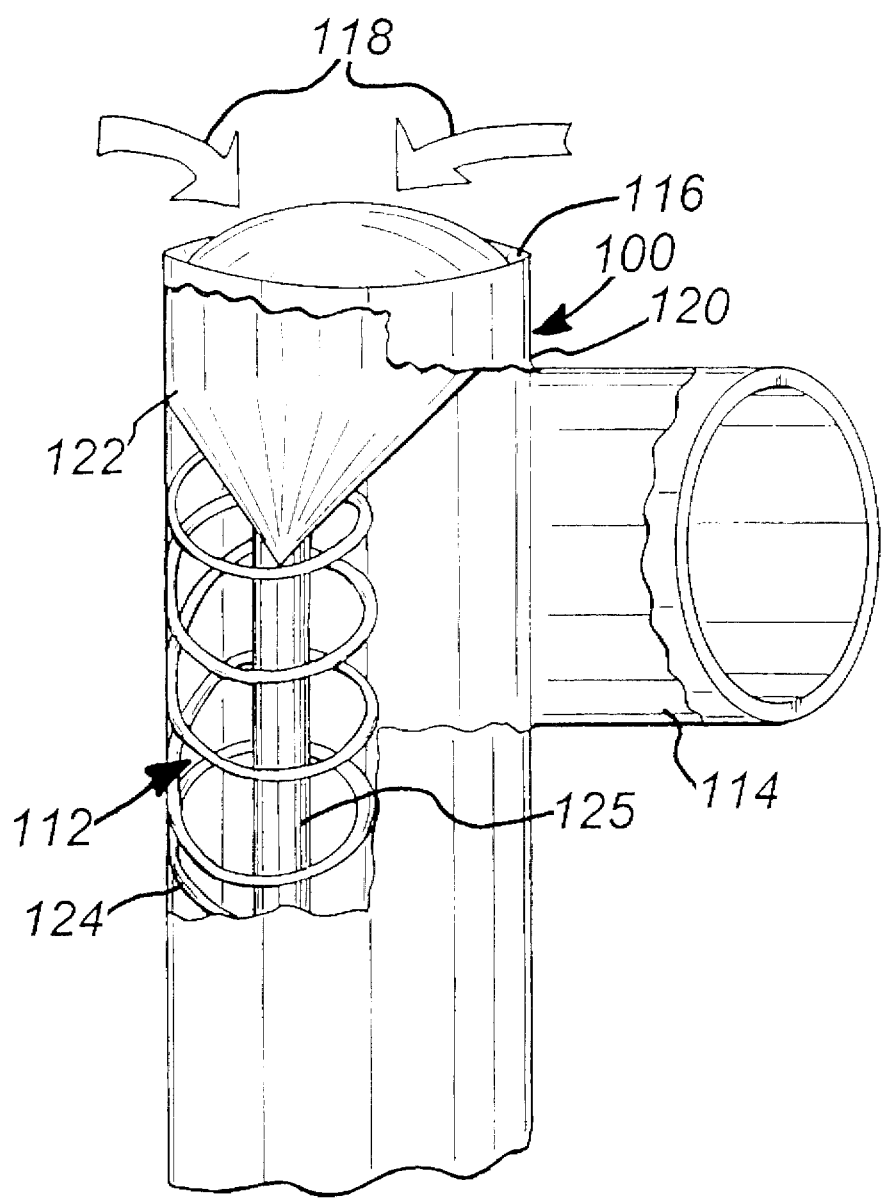
Figure 3:
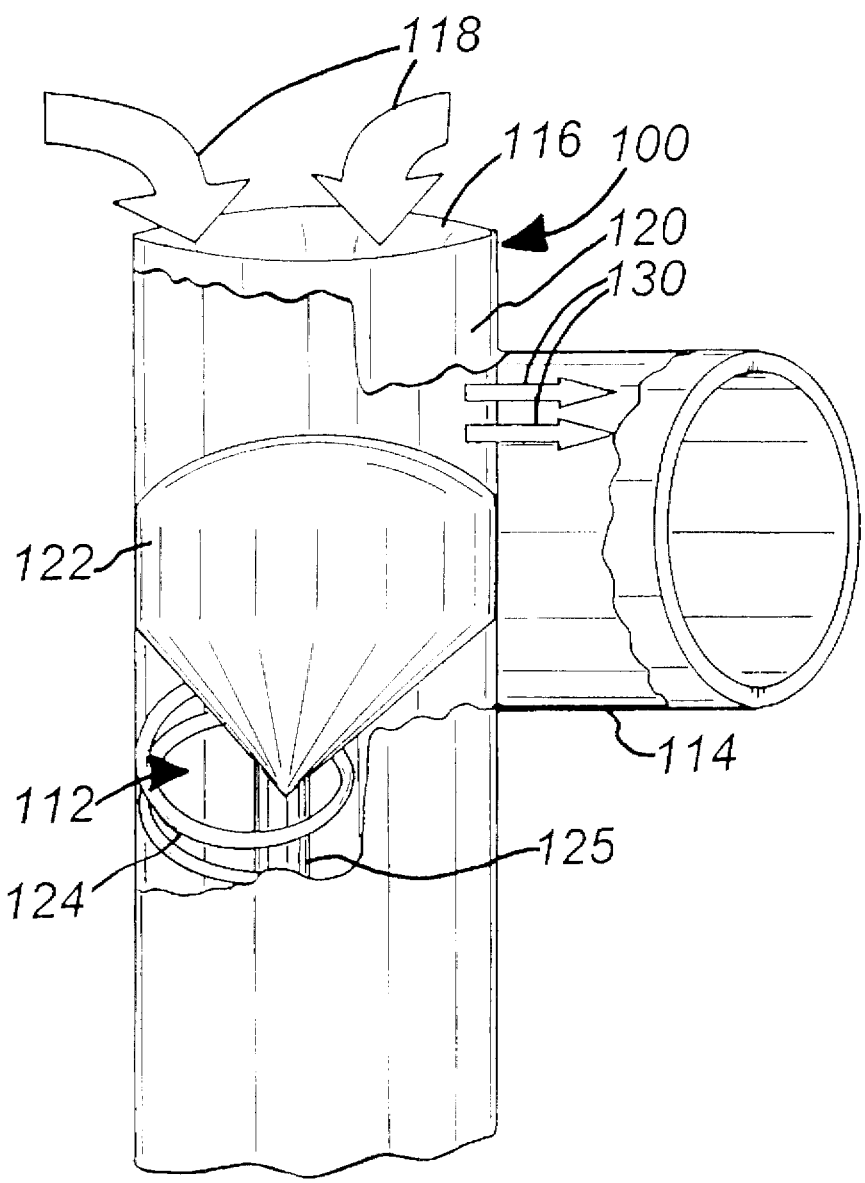
Figure 4:
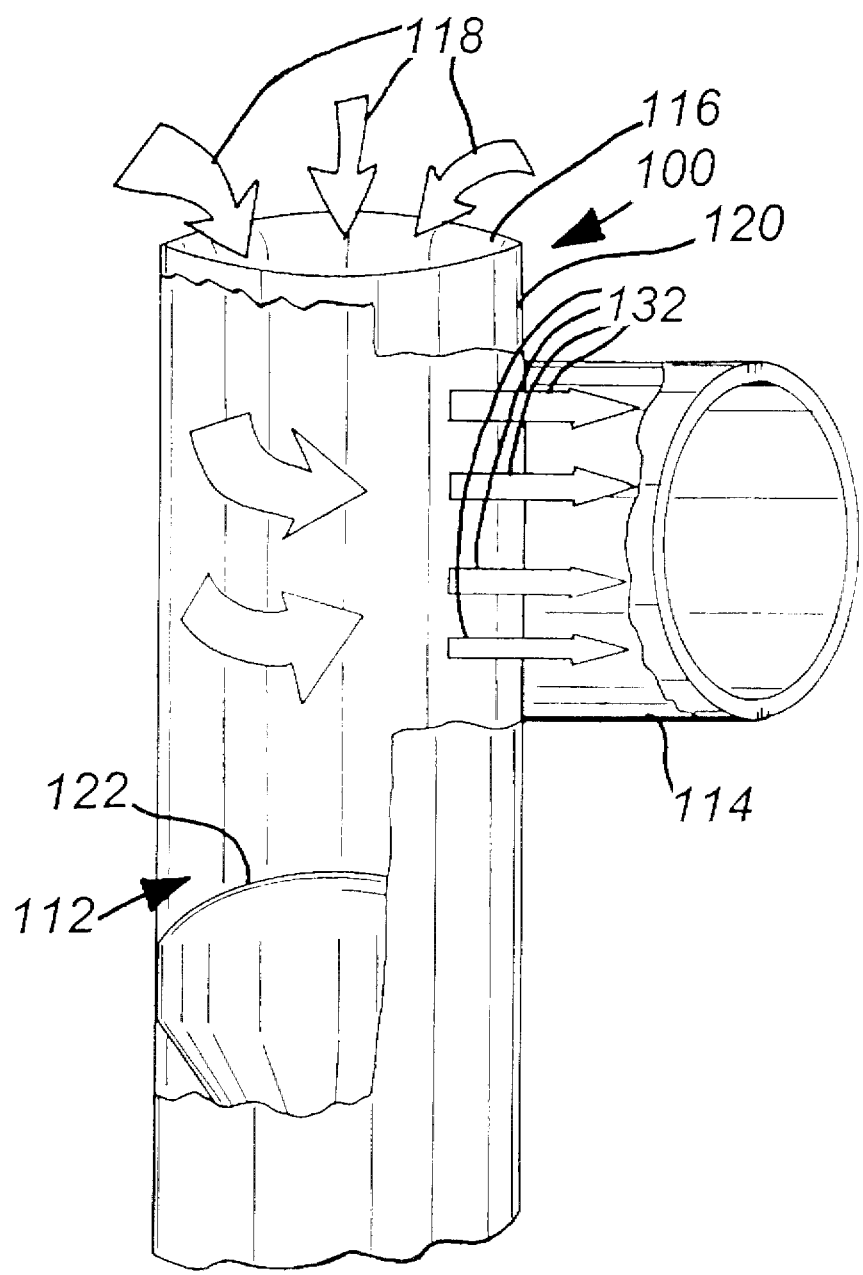
Figure 5:
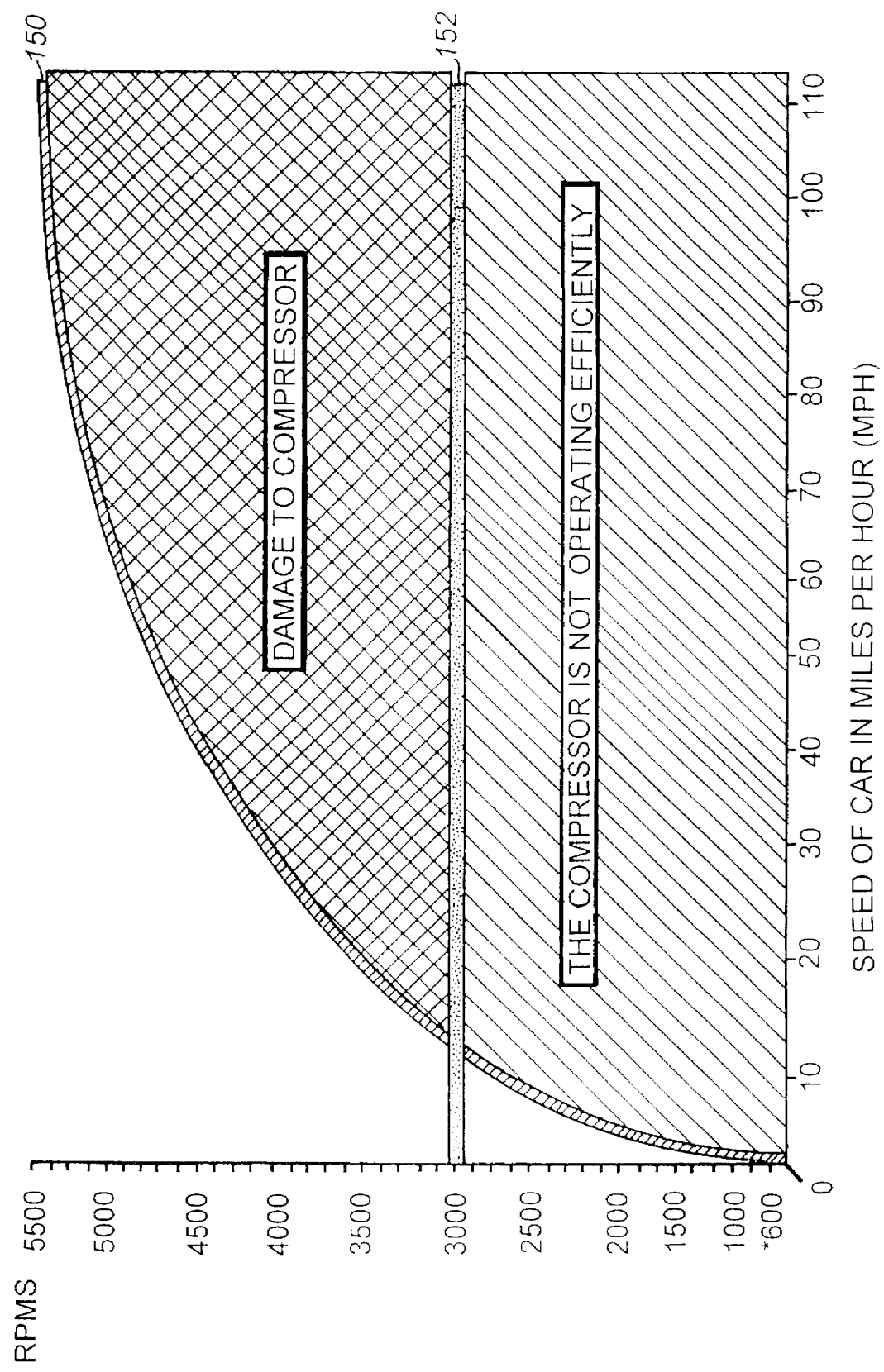

3 following detailed description as illustrated by the drawings, in which:

FIG. 1 is a schematic view of an air conditioning system according to this invention;

FIG. 2 is a partially-exposed schematic perspective view of a control valve for use in the air conditioning system according to this invention in a fully closed state;

FIG. 3 is a partially-exposed schematic perspective view of the control valve of FIG. 2 operating at a vehicle cruising speed;

FIG. 4 is a partially-exposed schematic perspective view of the control valve of FIG. 2 operating at a high vehicle speed; and FIG. 5 is a graph comparing the operation of a conventionally-driven air conditioning compressor to a compressor that is driven according to this invention.

DETAILED DESCRIPTION

An air conditioning system according to this invention is illustrated schematically in FIG. 1. The system 20 is part of an overall automotive power system including an engine 22 that powers a drive shaft 24 for driving vehicle wheels. The engine, according to this embodiment, comprises an internal combustion engine that derives power from the explosive burning of conventional fossil fuels, and exhausts combustion products of the fuel through an exhaust manifold 26. However, other types of engines can be substituted according to this invention. The engine 22 according to this embodiment also includes a front power takeoff 28 comprising a drive shaft 30 that is, in this embodiment, a portion of the engine's crank shaft (not shown), that is also interconnected with the drive shaft 24. The power takeoff 28 includes a pulley 32 that drives a power transmission belt 34 interconnected with an additional pulley set 36. The pulley set 36 is used to power a generator 38 via an additional power transmission belt 40. A variety of components can be interconnected by associated power transmission belts and pulleys to the main power takeoff 28. For example, a water pump, a cooling fan, a power steering pump, and, of course, an air conditioning compressor can all be linked by associated belts that are in rotational communication with the power takeoff 28. In addition, a plurality of power takeoffs can be provided to the front of the engine using gears located within a gear case. The generator 38 according to this embodiment powers a battery 42 for reserve electrical energy. The generator 38 and battery 42 are used, in part, to power auxiliary systems such as climate control, lighting, radio and instrumentation via power output cables 44.

The power takeoff 28 is interconnected with another drive pulley 48 that, in this embodiment, is provided on the drive shaft 30. It should be clear that the pulley 48 can be provided at any position relative to the engine 22 and can be driven by gears or another drive belt according to an alternate embodiment.

The pulley 48 drives a power transmission belt 50 that is interconnected with an opposing drive pulley 52. According to this embodiment, the pulley 52 is interconnected to a drive shaft 54 that powers the air conditioning system 20 according to this invention. The air conditioning system 20 will now be described in further detail.

The air conditioning system 20 includes an air conditioning compressor 60 that circulates a refrigerant through a closed-loop comprising an output line 62 and a return line 64 that are interconnected with a condenser 66. The condenser

4

66 is provided adjacent a blower fan 68 that passes air (arrows 67) over the condenser 66 that is delivered into the cockpit of the vehicle (not shown) in the form of cool air. The blower fan 68 is electrically powered and interconnected with a fan speed control 69 on a control console 71. A variety of fan speed controls such as rheostats, potentiometers and digital/microprocessor speed controls can be utilized.

The compressor 60 according to this embodiment is similar or identical in form to that of the prior art. However, unlike the prior art, the compressor 60 is not interconnected directly with the final drive pulley 52. Rather, the final drive pulley 52 is connected by drive shaft 54 to a compressor or pump 70 that is adapted to drive a fluid under pressure. The pump can comprise a piston, impeller or other mechanism for transferring mechanical energy to a fluid. The fluid, according to this embodiment, can comprise a variety of generally-available hydraulic fluids such as those used in power brakes and power steering mechanisms.

The pump 70 derives energy from the drive shaft 54 which, in turn, is powered by the belt 50 and pulleys 48 and 52. The exact placement of the pump and other components described herein can be varied depending on the size and shape of the engine compartment of the vehicle. The illustrated system 20 is, thus, to be taken only by way of example and a variety of placements, shapes and sizes of components are expressly contemplated.

The pump 70 receives fluid through an inlet port 72 that is interconnected with a fluid, sump, well or reservoir 74. The fluid is impelled by the pump 70 through an outlet port 76 into a sealed compression chamber 78. Fluid enters the compression chamber 78 under pressure due to the mechanical action of the pump 70. The pressurized fluid in the compression chamber 78 is routed selectively through a variety of channels that, in substance, control the operation of the air conditioning system 20 according to this invention. The primary outlet of the chamber 78 is a turbine housing 90 that encloses a turbine blade 92 of conventional design. Other fluid pressure-to-mechanical motion devices are also expressly contemplated. In this embodiment, the turbine blade is impelled by the fluid under pressure. The fluid causes the turbine blade to rotate a drive shaft 94 that is interconnected with the air conditioning compressor 60 according to this invention. As described below, by varying the pressure in the chamber, the rotation of the turbine blade 92 can be controlled and/or enabled and disabled on command. When fluid passes through the turbine blade 92, it is routed to a return port 96. It is transferred by a line 98 back to the reservoir 74 where it is reused by action of the pump 70.

Since the pump 70 is interconnected directly with the engine, it's speed of operation will vary in proportion to the speed of the engine. Hence, at various times larger and smaller amounts of fluid are transferred into the pressure chamber 78, resulting in higher and lower fluid pressures in the chamber 78. The pressure chamber 78 and turbine 92 are sized and structured so that at an idle speed, a minimum acceptable rotation of the air conditioner compressor 60, via the turbine 92, occurs. However, to prevent excessive rotation at higher engine speeds, the system 20 must account for the substantial increase in fluid pressure in the chamber 78 resulting from high speed driving of the pump 70. Accordingly, a pair of waste ports 100, 102 are provided upstream of the turbine 92 within the chamber 78. These waste ports 100, 102 act to control the excess pressure in the chamber 78 by routing fluid back to the reservoir 74.

Reference is made first to the control waste port 102 that is electrically connected by wires 104 to a temperature control switch 106 on the control console 71. The temperature control switch 106, according to this embodiment, can comprise any acceptable control including, but not limited to, a digital control, a microprocessor, a rheostat, or a settable thermostat. The temperature control 106 transmits signals on the wires 104 to selectively open and close a valve 110 located at the waste port 102. The valve 110 can comprise any acceptable valve mechanism that is electrically or mechanically controlled. Note that a mechanically controlled valve may be operated by a mechanical temperature controller, without electrical wires 104. The valve 110 opens and closes differing amounts so that it varies the amount of fluid that can exit the chamber 78 at a given pressure.

In operation, by signaling the valve 110 to open completely (a "HIGH" temperature setting), a large proportion of the fluid in the chamber 78 is transferred back into the reservoir 74. Accordingly, insufficient pressure remains in the chamber 78 for powering the turbine 92. Hence, the turbine 92 and air conditioner compressor pump 60 receive little or no power. Conversely, if the valve 110 is closed completely (a "low" temperature setting), the pressure in the chamber 78 is maintained at a very high value and the turbine 92 receives maximum pressure, enabling it to rotate at a maximum speed (in this embodiment, approximately 3000 RPM), providing a maximum cooling power to the air conditioning compressor 60. Opening the valve partially results in an intermediate level of turbine rotational driving, resulting in an intermediate cooling by the air conditioner compressor 60.

Thus, the control waste port 102 and valve 110 can variably control the chamber pressure 78 over a predetermined range of fluid pressures. However, as described above, pressure in the chamber 78 also varies based upon the speed of operation of the pump 70, which is, itself, based upon the speed of the engine 22. Thus, a further regulating waste port 100 is used. The regulating waste port 100 includes a check valve 112, according to this embodiment, that provides an absolute control of fluid pressure in the chamber 78. As described further below, when fluid pressure in the chamber exceeds a predetermined maximum value, the valve 112 is signaled to open and direct excess fluid through the line 114 back to the reservoir 74.

With further reference to FIGS. 2-4, the valve 112 is detailed in a fully closed (FIG. 2), partially opened (FIG. 3) and fully opened (FIG. 4) state of operation. As noted, the valve 112 according to this embodiment is a form of check valve. The valve 112 consists of an inlet 116 that enables fluid (see arrows 118) to enter the valve housing 120. The inlet 116 can include a seal or other structure that engages a moving stop 122. The stop 122, according to this embodiment, is a hemispherical plug. It is contemplated that any suitable shape of movable stop can be utilized according to this invention. Such stops can include an elastomeric or metallic ball, a cylinder, a cone or any other structure that maintains a breakable seal relative to a pressure chamber 78 in (FIG. 1). The stop 122 in this embodiment is biased against the inlet 116, in a sealed relationship, by a spring 124. The spring 124 in this embodiment comprises a compression spring that surrounds a spring guide 125 that is joined to the stop 122. The guide 125 maintains the spring 124 and stop 122 in alignment with the housing 120 as the stop 122 moves relative to the housing 120.

The spring constant of the compression spring 124 is chosen so that the stop 122 maintains a seal against the inlet 116 until a predetermined maximum pressure is reached in the pressure chamber 78 in (FIG. 1). At such time, the force of the spring 124 is overcome by the pressure bearing upon the stop 122 and the stop is moved away from the inlet 116. The resultant motion breaks the seal between the stop 122 and the inlet 116 and enables fluid from the pressure chamber 78 in (FIG. 1) to flow through the valve housing 120 and into the reservoir return line 114.

In this manner, the valve 112 ensures that the pressure of fluid present in the pressure chamber 78 never exceeds a predetermined maximum value. This maximum pressure value ensures a maximum desired driving speed for the turbine 92 when the control valve is also fully closed.

As depicted in FIGS. 2-4, at low pressure (FIG. 2) the stop 122 remains fully sealed against the inlet 116. Hence, all available pressure is retained within the pressure chamber 78. Such pressure is either routed through the turbine 92 or, alternatively, is bled from the system by the control valve 110 via line waste line 102.

At a higher pressure when, for example, the engine is driven at a cruising speed of 3,500 RPM, the stop 122 is partially opened by the fluid pressure and a portion of the fluid (arrows 130) is bled from the system through the line 114. It can be assumed that all remaining pressure is relieved either by routing fluid through the turbine 92 and/or exhausting fluid through the control valve 110.

At an approximate maximum speed (FIG. 4) when, for example, the engine is powered at approximately 6,000 RPM, the stop 122 is biased into a completely-opened position and a majority of fluid (arrows 132) is delivered through the line 114. As noted above, any remaining pressure is routed through either the turbine 92 or the control valve 110.

It should be clear that there is a direct relationship between the turbine 92, control valve 110 and check valve 112. The system, by means of these 3 outlets, maintains an equilibrium pressure in the pressure chamber 78. By varying any one of the system's components, (e.g., check valve force, control valve opening size, chamber pressure and turbine resistance) the equilibrium is altered. The resulting system, however, serves to maintain a substantially constant turbine driving force at all times. Hence, excess driving force, in the form of fluid pressure, is routed away from the turbine 92 so that the turbine is not driven at an excessive, potentially-damaging, speed. Conversely, the system is set so that, at minimum engine RPM, a minimum driving force can be provided to the turbine 92 for powering the air conditioning system. The level of pressure is set at a predetermined "equilibrium" value that is constant throughout the full range of engine speeds. Thus, the compressor is driven at a constant speed regardless of engine speed.

While the system provides a minimum driving force for the air conditioner compressor 60 at low RPM, it is contemplated that auxiliary driving power may be required since there may not exist sufficient driving power to run the compressor at low RPM. Hence, a further clutch-operated linkage (not shown) may join the compressor 60 to the engine at low RPM. Likewise, an electric motor or similar auxiliary power unit (not shown) can be provided to the compressor 60 for driving the compressor at low RPM. The primary advantage of the system of the air conditioning system 20, according to this embodiment, is that excessive driving of the air conditioner system at high RPM is avoided. Likewise, the passage of pressurized fluid from the fluid chamber 78 through the turbine 92 provides a more-gentle transition to the compressor 60 at start-up than the dead-start and dead-stop that is normally associated with a direct-driven compressor having a clutch according to the prior art.

With further reference to FIG. 5, the graph illustrates the difference between a directly-driven air conditioning compressor and an air conditioning compressor driven according to this embodiment. The increasing curve 150 represents the RPMs of a directly-driven compressor. Over approximately 15 miles per hour, according to this example, damage to the compressor can occur through excessive driving speed. Likewise, under approximately 15 mph, the compressor is not operating efficiently since the input RPMs are too low to provide an adequate cooling cycle. Conversely, the performance of the compressor according to this embodiment is illustrated by the substantially-flat line 152 showing a compressor speed of approximately 3,000 RPM throughout the range of automobile speed from 0 mph to approximately 110 mph. It is contemplated that some drop in RPM may occur at very low speed. However, by providing an efficient turbine 92 and a sufficiently powerful pump 70, a fairly constant air conditioner compressor speed can be obtained according to this invention.

The foregoing has been a detailed description of a preferred embodiment. Various modifications and additions can be made without departing from the spirit and scope of this invention. For example, the check valve utilized herein is a mechanical ball-and-spring-type valve with a stop that seals against an inlet. A rotating valve or another type of valve that opens selectively in response to pressure can be substituted. Additionally, an electrically operated-valve that opens and closes in response to a sensed pressure in the pressure chamber can also be substituted. Such a valve would include a pressure transducer or other sensor within the pressure chamber and would be directed to open and close to allow a predetermined volume of fluid to escape for a predetermined time based upon the sensed pressure in the chamber. Additionally, while the fluid pump of this invention is connected to the engine, it can also be connected to other portions of the drive train such as the transmission or wheel axles. As such, this description is meant to be taken only by way of example and not to otherwise limit the scope of the invention.

What is claimed is:

1. An air conditioning system for vehicles comprising:

an air conditioning compressor;

a source of fluid;

a pump in communication with the fluid and operatively interconnected with and driven by an engine of the vehicle;

a pressure chamber interconnected with the pump and receiving fluid from the pump;

a fluid drive element, located relative to the pressure chamber, and interconnected with the air conditioning compressor, that converts passage of pressurized fluid therethrough into mechanical driving force for driving the air conditioning compressor; and a regulator that maintains a selected level of pressure in the pressure chamber and that diverts excess fluid from the pressure chamber to the pump, the regulator including a control valve that transfers a predetermined volume of fluid from the pressure chamber in response to a control signal for selectively varying the selected level of pressure in the pressure chamber to, thereby, vary a pressure of fluid directed to the fluid drive element.

2. The system as set forth in claim 1 wherein the regulator comprises a check valve that opens in response to a fluid pressure in the pressure chamber that exceeds a predetermined maximum value.

3. The system as set forth in claim 2 wherein the check valve comprises a movable stop and a spring that biases the movable stop into a sealed orientation, the spring having a force that is overcome by a predetermined pressure greater than the maximum pressure.

4. The system as set forth in claim 1 further comprising a fluid outlet adjacent to the drive element for returning fluid to the pump subsequent to passage of the fluid through the drive element.

5. The system as set forth in claim 1 wherein the vehicle engine includes a drive belt and wherein the pump includes a pulley interconnected with the drive belt, the pulley constructed and arranged to be rotated by the drive belt.

6. A method for driving a vehicle air conditioning system comprising:

providing fluid;

pumping fluid into a pressure chamber, the step of pumping including driving a pump based upon energy derived from a vehicle engine;

directing, at predetermined times, fluid from the pressure chamber through a drive element and driving, with the drive element, an air conditioning compressor; and regulating a pressure of fluid in the pressure chamber to maintain a predetermined maximum value by, at selected times, redirecting at least some of the fluid to the pump and selectively opening and closing a port interconnected with the pressure chamber to direct a predetermined amount of fluid back to the pump based upon a desired cooling temperature.

7. The method as set forth in claim 6, wherein the step of regulating includes operating a pressure-actuated valve to maintain the predetermined maximum value.

8. The method as set forth in claim 6, wherein the step of selectively opening and closing includes providing a remote control in the vehicle for operating a valve interconnected with the pressure chamber.

9. The method as set forth in claim 6, further comprising directing, at predetermined times, fluid from the drive element back to the pump.

10. A method for driving a vehicle-mounted pumping mechanism at a selected substantially-constant speed of operation comprising:

providing a pump, the pump being variably driven based upon a predetermined power input from a motive power source;

providing a fluid in communication with the pump;

providing a pressure chamber that receives fluid from the pump under pressure;

maintaining a selected substantially-constant fluid pressure in the chamber including diverting excess fluid back to the pump;

directing fluid at the selected substantially constant pressure through a drive element that is operatively interconnected with a vehicle-mounted pumping mechanism and driving the vehicle-mounted pumping mechanism with the drive element; and selecting an amount of excess fluid diverted to the pump based upon a desired driving power to be directed by the drive element to the vehicle-mounted pumping mechanism.

\* \* \* \* \*